United States Patent Office 2,821,507
Patented Jan. 28, 1958

2,821,507
BLENDED SILICONE LUBRICATING FLUIDS

Gordon C. Gainer and Russell M. Luck, Pittsburgh, Pa., assignors to Westinghouse Electric Corporation, East Pittsburgh, Pa., a corporation of Pennsylvania No Drawing. Application August 12, 1955
Serial No. 528,109

5 Claims. (Cl. 252—49.6)

The present invention relates to lubricants and has particular reference to silicone fluid lubricants having extremely low viscosities and outstanding lubricating properties over a wide range of temperatures whereby they are adapted to lubricate relatively movable metal to metal surfaces.

Turbo jet and gas turbine aircraft operate over a wide range of temperatures. At high altitudes such aircraft frequently encounter temperatures as low as −65° F. In addition, military aircraft may be subjected to extremely low environmental temperatures in frigid or polar climates. Such aircraft are required to start immediately. The latter requirement demands that the lubricant be of a low viscosity so that it is readily pumpable at temperatures as low as −65° F.

After the plane has landed and the engine has been shut off, heat from the red-hot turbo rotor soaks back along the shaft to the main bearings wherein the lubricant is subjected to "frying" temperatures of 400° F. and higher. The lubrication of the moving metal parts in such turbo jet or gas turbine engines operating within this wide temperature range has presented a problem which has been difficult to solve. Petroleum base lubricants, even when highly refined, have not proved to be completely satisfactory.

It has been suggested in U. S. Patent 2,456,496, which is assigned to the assignee of the present invention, that organosiloxane fluids comprising dimethylsilicones be used as bearing lubricants. Such materials have excellent heat stability and undergo a remarkably low change in viscosity with changes in temperature, when compared to other known lubricants. Dimethylsilicones have poor film strength, however, when employed on ferrous metal surfaces—particularly under boundary lubricating conditions—and, in many bearing structures, excessive wear and a high coefficient of friction has been found.

The coefficient of friction of a commercially available dimethylsilicone lubricating fluid, representing about the best dimethylsilicone available at the present time, is approximately 0.36, steel against steel. When tested in a Falex machine, the dimethylsilicone fluids give an average wear rate, steel on steel, of 3600 wear units per hour. By contrast, highly refined petroleum base lubricants have coefficients of friction of from 0.13 to 0.20 under the same test conditions and Falex wear rates of from 2 to 8, or slightly more, units per hour. It is apparent from these data that in these properties, at least, the dimethylsilicones are not as satisfactory as the petroleum lubricants. Consequently, dimethylsilicones are suitable for lubrication use only in a limited number of applications and, then, generally, only under light loads.

It has been disclosed in copending application Serial No. 467,246, which also is assigned to the assignee of the present invention, that silicone fluids having satisfactory lubricating properties are obtained when halogen substituted phenyl groups are attached to certain of the silicon atoms along the linear siloxane chain. These fluids are prepared by hydrolyzing and equilibrating selected silicone monomers to form fluids having the formula (I)
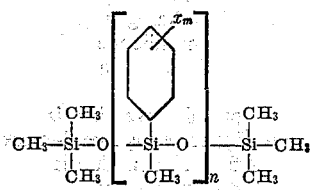

wherein $x$ represents at least one substituent selected from the group consisting of chlorine, bromine, fluorine and trifluoromethyl, $m$ has an average value of from 1 to 4, and $n$ has an average value of at least 1.

This fluid silicone composition has been determined to be a mixture of silicones which differ from one another only in the value of $n$. It is disclosed in said application Serial No. 467,246 that the fluid silicone fraction obtained on fractionation of the mixture of silicones and separating therefrom the fraction wherein $n$ has a value of 1, provides a fluid silicone having excellent lubricating properties and good viscometric properties at temperatures within the range of −112° F. to 400° F. However, the mixture of silicone fluids remaining, after the separation therefrom of the fraction wherein $n$ has a value of 1, does not have as good viscometric properties. The mixture of silicone fluids remaining, wherein $n$ has an average value of not less than 2, has a freezing point of not less than −40° F. As a consequence, that mixture of silicone fluids is not suitable for use as a lubricant at extremely low environmental temperatures such as are often encountered in aircraft powered by jet engines, since the mixture is a solid at −65° F.

Liquid linear organopolysiloxanes having the formula (a)
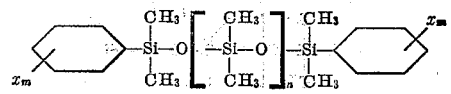

where in $x$, $m$ and $n$ have the same meanings set forth hereinabove, have been proposed for use as lubricants. Such materials have excellent viscometric properties and acceptably low viscosities at low temperatures and, as will be seen, have good lubrication characteristics but do not have optimum lubricating properties.

It is known that the lubricating ability of halogen substituted phenyl silicone fluids is directly related to the halogen content of the fluid. While the introduction of the polar halogen group into the silicone fluid produces a desirable enhancement of its lubricating ability, it also has the adverse effect of increasing the viscosity and viscosity temperature coefficient of the fluid, and also raising its freezing point.

Thus, the incorporation of additional halogen substituted phenyl groups into silicone fluids of the general Formula $a$ above to form a fluid having the formula:

(b)
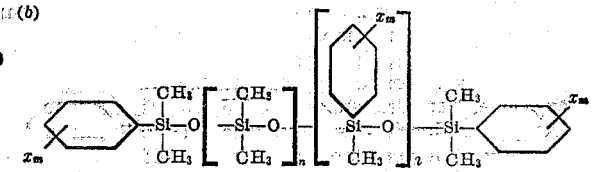

wherein $x$, $m$, and $n$ have the meanings as given hereinabove, has the desired result of increasing the lubricating characteristics of the silicone fluid but at the same time the undesired result of increasing its viscosity.

The resultant modified silicone fluid, therefore, still is not entirely suitable for use as a jet aircraft engine lubricant because the additional halogen substituted phenyl groups raise the viscosity and freezing point of the modified fluid to a degree such that it solidifies at temperatures substantially above —65° F.

The object of the present invention is to provide silicone fluid lubricants having outstanding lubricating properties and low viscosities at temperatures within the range of from about —65° F. up to about 400° F. by blending a silicone fluid having a relatively low viscosity at —65° F. and a relatively low halogen content with a selected proportion of at least one silicone fluid having a relatively high viscosity at —65° F. and a relatively high halogen content.

Another object of this invention is to provide an efficacious method of lubricating metal-to-metal surfaces by applying thereto a fluid silicone lubricant capable of fluid flow at temperatures within the range of from about —65° F. up to about 400° F., the lubricant comprising a blend of a silicone fluid having a relatively low viscosity at —65° F. and a relatively low halogen content with a predetermined proportion of at least one silicone fluid having a relatively high viscosity at —65° F. and a relatively high halogen content.

Other and further objects of the invention will, in part, be obvious and will, in part, appear hereinafter.

In the attainment of the foregoing objects and in accordance with the present invention, there is provided a fluid silicone lubricant comprising a mixture of (A) from one to twenty-five parts by weight of a liquid linear organopolysiloxane having the formula:

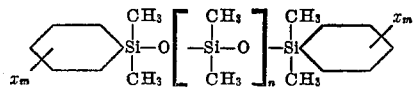

for (B) each one part by weight of at least one liquid linear organopolysiloxane selected from the group consisting of organopolysiloxanes having the formulae:

(a)

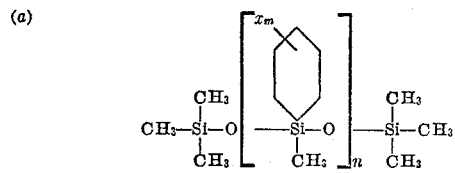

and (b)

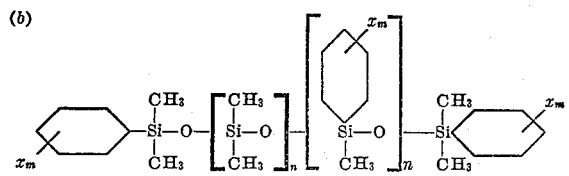

wherein $x$ represents at least one substituent selected from the group consisting of chlorine, fluorine, bromine, and trifluoromethyl, $m$ has an average value of from one to to five inclusive, and $n$ has an average value of not less than two.

The mixture of liquid linear organopolysiloxanes thus described has a low viscosity at temperatures down to —65° F. and excellent lubricating properties at any temperature throughout the entire range of —65° F. to 400° F. This result was not to be expected because the linear organopolysiloxanes individually have widely differing properties. Thus, the organopolysiloxanes (a) and (b) have excellent lubricating properties but are extremely viscous at temperatures above —65° F. whereas siloxane (A) has poorer lubricating properties, but still has a low viscosity at temperatures as low as —65° F.

The liquid linear organopolysiloxane identified as (A) above comprises essentially a linear or unbranched siloxane having repeating groups

and terminal groups

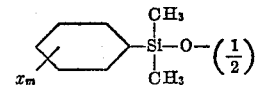

wherein $x$ and $m$ have the meanings set forth hereinabove.

The liquid linear organopolysiloxane (A) may be obtained by hydrolyzing and equilibrating a mixture of silane monomers, one of which has the formula (II)

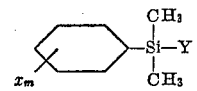

and the other of which has the formula (III)

wherein $x$ and $m$ have the meanings given hereinabove and Y is a hydrolyzable group.

The hydrolyzable groups, represented by Y in the above formulae, may be either alkoxy, aryloxy, halogen, acyl or amino groups. When the hydrolyzable group is an alkoxy material, the alkyl portion thereof may be either primary, secondary or tertiary, for example, methyl, ethyl, propyl, butyl, isopropyl, isobutyl, secondary butyl, tertiary butyl, hexyl and the like. When the hydrolyzable group is an aryloxy group, the aryl radical may be a phenyl radical or a substituted phenyl radical. In place of the alkoxy and aryloxy groups just described, any of the halogens or an amino or acyl group may be used as the hydrolyzable group in accordance with this invention. It is preferred to use those silane monomers having hydrolyzable radicals which are halogen groups since such monomers are more readily available commercially.

Examples of preferred silane monomers having the structure set forth in Formula II hereinabove include x,x-dichlorophenyldimethylchlorosilane, 3,4-dichlorophenyldimethylchlorosilane, x,x,x - trichlorophenyldimethylchlorosilane, and 3-trifluoromethyl-4-chlorophenyldimethylchlorosilane.

The following example illustrates one method for preparing a liquid linear organopolysiloxane having the structure indicated in Formula A above. The parts indicated throughout the specification and in the appended claims are by weight unless otherwise noted.

EXAMPLE I

A mixture of 774 parts (6 mols) of dimethyldichlorosilane and 479 parts (2 mols) of x,x-dichlorophenyldimethylchlorosilane was stirred in a suitable vessel.

The mixture then was hydrolyzed by admixing with a large excess of crushed ice, the temperature of the materials being maintained within the range of 0° C. to 15° C. The mixture was stirred rapidly and a sticky silicone mass formed and deposited on the stirrer and sides of the flask as hydrolysis proceeded. The aqueous hydrochloric acid which formed during hydrolysis was decanted from time to time and fresh ice and water were added to minimize the formation of a strong hydrochloric acid solution. After the hydrolysis had proceeded substantially to completion, the mixture was allowed to warm up to room temperature and was vigorously stirred for about 18 hours. At the end of this time the mixture was permitted to stand and separate into a fluid silicone layer and an aqueous acidic layer. The silicone layer was withdrawn, washed with water and then dried over anhydrous sodium sulphate to yield 2635 parts of an anhydrous silicone oil. The latter was chilled to a temperature of from 10° C. to 20° C. and was equilibrated by the dropwise addition of 131.75 parts (5% by volume) of concentrated sulfuric acid. The acidified mixture was stirred for 60 hours at 20° C. to 25° C. The equilibrated silicone emulsion then was poured into a large excess of crushed ice. After thorough mixing the silicone fluid was permitted to separate as a distinct layer which was decanted, washed to neutrality with a sodium bicarbonate solution and dried over a mixture of anhydrous sodium sulphate and anhydrous sodium carbonate. The silicone oil thereby obtained then was stripped for two hours at 210° C. under a vacuum of 1 to 2 millimeters of mercury in a Claisen distillation apparatus to remove trace amounts of volatile components such as silanols and cyclic compounds.

This silicone oil was analyzed and established to have the formula

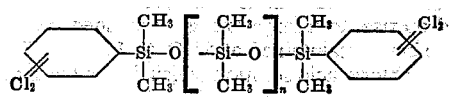

wherein $n$ has an average value of 6.

This liquid linear organopolysiloxane has a low viscosity, 6500 centistokes, at $-65°$ F. and lubricating properties as determined by the Shell Four Ball E. P. Test as follow:

| Applied load (kg.): | Average scar diameter (mm.) |
|---|---|
| 20 | .37 |
| 30 | .47 |
| 40 | .58 |
| 50 | .61 |
| 60 | .93 |
| 70 | .93 |
| 80 | 1.05 |
| 90 | 1.93 |
| 100 | Weld |

This silicone fluid had an immediate seizure value of 90 kg. and a weld of 100 kg.

The liquid linear organopolysiloxane ($a$) used in forming the blended fluid silicone lubricant of this invention may be obtained by hydrolyzing and equilibrating a selected group of silicone monomers to form a fluid silicone composition as described in application Serial No. 467,246. The silicone composition comprises a group of liquid silicones which differ from one another only in the value of $n$, as set forth in Formula I above. The mixture is fractionated and separated into two portions. One portion, wherein $n$ has a value of 1, may be used directly as a jet engine lubricant in accordance with the teachings of application Serial No. 467,246. The other portion, wherein $n$ has an average value of not less than 2, comprises the liquid linear organopolysiloxane ($a$) of this invention.

The liquid linear organopolysiloxane ($a$) comprises essentially linear or unbranched siloxanes having repeating groups

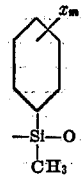

and terminal trimethylsilhemioxane groups

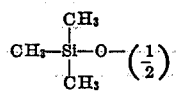

One convenient method of preparing the liquid linear organopolysiloxane ($a$) comprises hydrolyzing and equilibrating a mixture of silane monomers, one of which has the formula (IV)

and the other of which has the formula (V)

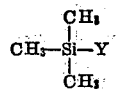

wherein $x$ and $m$ have the meanings given hereinabove and Y represents hydrolyzable groups. The fluid thus obtained is a mixture of silicones which differ from one another only in the value of $n$ as indicated in Formula I above or more particularly in the number of substituted phenyl groups in siloxy groups present in the molecule. The fluid is fractionated to recover only those silicones wherein $n$ in the Formula I has an average value of not less than 2.

Examples of preferred silane monomers having the structure set forth in Formula IV hereinabove include x,x - dichlorophenylmethyldichlorosilane, 3,4 - dichlorophenylmethyldichlorosilane, x,x,x,-trichlorophenylmethyldichlorosilane, and 3 - trifluoromethyl - 4 - chlorophenyl - methyldichlorosilane.

The next two examples illustrate the preparation of liquid linear organopolysiloxanes having the structure illustrated in Formula a above.

EXAMPLE II

A mixture of monomers was prepared by stirring 2232 parts (8 mols) of 3,4-dichlorophenylmethyldichlorosilane and 1736 parts (16 mols) of trimethylchlorosilane in a suitable vessel. The mixture then was hydrolyzed and equilibrated in accordance with the procedure described in Example I. The dried silicone oil mixture then was placed in a Claisen distillation apparatus, heat and vacuum were applied and the fractions listed in Table I were obtained.

Table I

| Fraction | Boiling Point, °F. | Pressure (mm.) Hg | Viscosity (cs.) | | | Freezing Point, °F. |
|---|---|---|---|---|---|---|
| | | | $-65°$ F. | 100° F. | 210° F. | |
| I | 200-220 | 1 | 400 | 2.7 | 1.4 | Below $-94$ |
| II | 220-290 | 1 | 2,750 | 3.9 | 1.9 | Below $-94$ |
| III | 280-365 | 0.85 | Solid | 10.2 | 4.0 | $-60$ |
| IV | Pot Residue | | Solid | 66.1 | 12.0 | $-13$ |

A composite silicone fluid comprising fraction III was found to have the following formula:

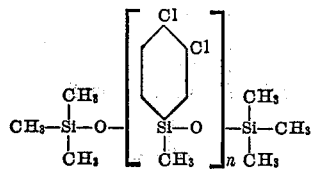

wherein $n$ has an average value of 2.75. The lubricating properties of this mixture of fractions were determined by the Shell Four Ball E. P. Test for steel against steel with the following data being obtained:

| Applied load (kg.): | Average scar diameter (mm.) |
|---|---|
| 20 | .32 |
| 30 | .44 |
| 40 | .48 |
| 50 | .81 |
| 60 | .84 |
| 70 | 1.00 |
| 80 | 1.03 |
| 90 | 1.02 |
| 100 | 1.12 |
| 110 | 1.17 |
| 120 | 1.18 |
| 130 | 1.23 |
| 140 | 1.25 |
| 150 | Weld |

EXAMPLE III

A monomer mixture comprising 2232 parts (8 mols) of x,x-dichlorophenylmethyldichlorosilane and 1736 parts (16 mols) of trimethylchlorosilane was hydrolyzed, equilibrated and vacuum distilled in a Claisen distillation apparatus in accordance with the method described in Example I. The properties of the fractions obtained are listed in Table II.

Table II

| Fraction | Boiling Point, °F. | Pressure (mm.) Hg | Viscosity (cs.) | | | Freezing Point, °F. |
|---|---|---|---|---|---|---|
| | | | −65° F. | 100° F. | 210° F. | |
| I | 210-290 | 1 | 3,270 | 5.5 | 1.99 | Below −94 |
| II | 290-380 | 1 | Solid | 38.90 | 6.15 | 17 |
| III | Pot Residue | | Solid | 815.6 | 21.0 | 41 |

The silicone fluid comprising fraction II was found to have the following formula:

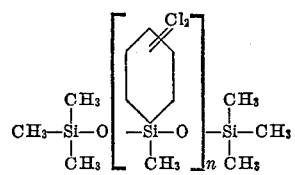

wherein $n$ has an average value of 2.75.

The lubricating properties of this mixture of fractions, as determined according to the Shell Four Ball E. P. Test for steel against steel, were as follows:

| Applied load (kg.): | Average scar diameter (mm.) |
|---|---|
| 20 | .32 |
| 30 | .31 |
| 40 | .32 |
| 50 | .37 |
| 60 | .51 |
| 70 | .81 |
| 80 | .97 |
| 90 | 1.01 |
| 100 | 1.01 |
| 110 | 1.09 |
| 120 | 1.10 |
| 130 | 1.14 |
| 140 | 2.67 |
| 150 | 2.93 |
| 160 | Weld |

The liquid linear organopolysiloxane identified as ($b$) above comprises essentially a linear or unbranched siloxane having the following repeating groups:

and

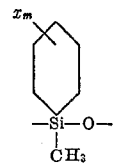

and terminal groups:

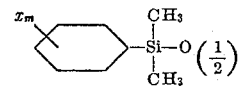

where $x$ and $m$ have the meanings set forth hereinabove.

The liquid linear organopolysiloxane ($b$) may be prepared by hydrolyzing and equilibrating a mixture of silane monomers in much the same way as described hereinabove with respect to the preparation of the organopolysiloxanes identified as (A) and ($a$). Similar silane monomers and similar hydrolyzing and equilibrating agents may be used as in previous examples.

The following example illustrates one method for preparing a liquid linear organopolysiloxane having the structure indicated in Formula $b$ above.

EXAMPLE IV

A mixture of 497 parts (2 mols) of x,x-dichlorophenyldimethylchlorosilane, 1548 parts (12 mols) of dimethyldichlorosilane, and 780 parts (3 mols) of x,x-dichlorophenylmethyldichlorosilane was hydrolyzed by adding the same dropwise, to a large excess of crushed ice, the temperature being maintained at 5° C. to 15° C. The aqueous hydrochloric acid solution which formed was decanted several times from the cloudy oil formed during the hydrolysis. More ice was added from time to time to reduce the acid concentration. After completion of the silane addition, the mixture was allowed to warm to room temperature and was stirred over night. The oil was then separated from the aqueous hydrochloric acid, washed two times with water, and dried over anhydrous sodium sulfate. The dried silicone fluid was cooled to 10° C. to 20° C. and was equilibrated by the dropwise addition of 70 parts (5% by volume) of concentrated sulfuric acid. After being stirred for 60 hours at 20° C. to 25° C., the silicone oil-acid mixture was poured onto a large excess of crushed ice. The oil was separated from the acid, neutralized by the addition of an aqueous sodium bicarbonate solution, and was finally dried over anhydrous sodium sulfate. The oil thereby obtained then was stripped for two hours at 275° C. under a vacuum of 6 to 7 millimeters of mercury in a Claisen distillation apparatus.

This silicone oil was found to have the formula

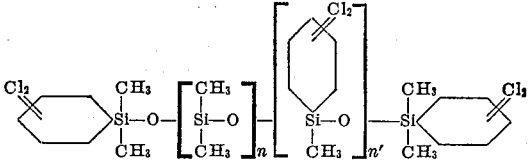

wherein $n$ has an avearge value of 12 and $n'$ has an average value of 3. This liquid linear organopolysoloxane freezes to a solid at temperatures below −45° C. Its lubricating properties as determined by the Shell Four Ball E. P. Test are as follows:

| Applied load (kg.): | Average scar diameter (mm.) |
|---|---|
| 20 | .33 |
| 30 | .35 |
| 40 | .60 |
| 50 | .48 |
| 60 | .97 |
| 70 | 1.14 |
| 80 | 1.72 |
| 90 | 1.60 |
| 100 | 2.10 |
| 110 | 2.70 |
| 120 | 3.11 |
| 140 | 3.21 |
| 150 | 3.45 |
| 160 | Weld |

The following examples are illustrative of fluid silicone lubricants obtained by blending the several liquid linear organopolysiloxanes in the proportions herein described.

EXAMPLE V

Four parts by weight of the liquid silicone fluid prepared as described in Example I were thoroughly stirred and admixed together with one part of the liquid silicone fluid prepared as described in Example II. The stirring was continued until a clear homogeneous solution was obtained. The fluid silicone lubricant thus obtained has a viscosity at −65° F. of 12,500 centistokes and a freezing point of below −94° F. The lubricating properties of this material as determined by the Shell Four Ball E. P. Test are as follows:

| Applied load (kg.): | Average scar diameter (mm.) |
|---|---|
| 20 | .32 |
| 30 | .37 |
| 40 | .52 |
| 50 | .79 |
| 60 | .92 |
| 70 | 1.02 |
| 80 | 1.81 |
| 90 | 1.11 |
| 100 | 1.70 |
| 110 | 2.70 |
| 120 | Weld |

This blended oil is suitable for use as a lubricant in jet aircraft engines.

EXAMPLE VI

Four parts of the organopolysiloxane of Example I were admixed with one part of the organopolysiloxane of Example III. This material had a viscosity at −65° F. of 26,600 and a freezing point of −72° F. The lubricating properties of this material as determined in the Shell Four Ball E. P. Test are as follows:

| Applied load (kg.): | Average scar diameter (mm.) |
|---|---|
| 20 | .29 |
| 30 | .33 |
| 40 | .50 |
| 50 | .72 |
| 60 | .88 |
| 70 | .83 |
| 80 | 1.10 |
| 90 | 1.86 |
| 100 | Weld |

This fluid had an immediate seizure value of 90 kg. and a weld of 100 kg. It is an excellent lubricant for such applications as steam turbines and electric motors.

EXAMPLE VII

A fluid silicone lubricant was prepared by admixing three parts of the organopolysiloxane of Example I with one part of the organopolysiloxane of Example II. This fluid lubricant had a viscosity at −65° F. of 14,000 and a freezing point of below −94° F. The lubricating characteristics of this silicone lubricant as determined in the Shell Four Ball E. P. Test are as follows:

| Applied load (kg.): | Average scar diameter (mm.) |
|---|---|
| 20 | .34 |
| 30 | .34 |
| 40 | .50 |
| 50 | .62 |
| 60 | .73 |
| 70 | 1.01 |
| 80 | 1.07 |
| 90 | 1.03 |
| 100 | 2.21 |
| 110 | Weld |

This fluid had an immediate seizure value of 90 kg. and a weld of 110 kg.

This silicone fluid is an excellent lubricant for use in jet aircraft engines.

EXAMPLE VIII

A fluid silicone lubricant was prepared by mixing three parts of organopolysiloxane of Example I with one part of the organopolysiloxane of Example III. This silicone lubricant had a viscosity at −65° F. of 42,200 and a freezing point of −71° F. The lubricating characteristics of this lubricant as determined in the Shell Four Ball E. P. Test are as follows:

| Applied load (kg.): | Average scar diameter (mm.) |
|---|---|
| 20 | .31 |
| 30 | .35 |
| 40 | .47 |
| 50 | .68 |
| 60 | 1.08 |
| 70 | 1.09 |
| 80 | 1.11 |
| 90 | 1.56 |
| 100 | 1.86 |
| 110 | Weld |

This fluid had an immediate seizure value of 90 kg. and a weld of 110 kg.

This fluid is suitable for such applications as steam turbine lubrication systems. It also may be used as an electric motor lubricant.

EXAMPLE IX

A fluid silicone lubricant was prepared by admixing two parts of the organopolysiloxane of Example I with one part of the organopolysiloxane of Example II. This material had a viscosity of 16,400 centistokes at −65° F. and a freezing point of −80° F. Its lubricating characteristics as determined in the Shell Four Ball E. P. Test are as follows:

| Applied load (kg.): | Average scar diameter (mm.) |
|---|---|
| 20 | .39 |
| 30 | .45 |
| 40 | .48 |
| 50 | .59 |
| 60 | .77 |
| 70 | .97 |
| 80 | .97 |
| 90 | 2.10 |
| 100 | 1.13 |
| 110 | Weld |

This material had an immediate seizure value of 90 kg. and a weld of 110 kg.

This fluid is an excellent lubricant for use in jet aircraft engines.

EXAMPLE X

A fluid silicone lubricant was prepared by mixing two parts of the organopolysiloxane of Example I with one part of the organopolysiloxane of Example III. The resulting fluid silicone lubricant had a viscosity at −65° F. of 70,800 centistokes and a freezing point of −73° F. The lubricating characteristics of this material as determined in the Shell Four Ball E. P. Test are as follows:

| Applied load (kg.): | Average scar diameter (mm.) |
|---|---|
| 20 | .38 |
| 30 | .35 |
| 40 | .52 |
| 50 | .64 |
| 60 | .83 |
| 70 | 1.05 |
| 80 | 1.04 |
| 90 | 2.03 |
| 100 | 1.12 |
| 110 | 4.33 |
| 120 | 2.50 |
| 130 | Weld |

This fluid had an immediate seizure value of 90 kg. and a weld of 130 kg.

This fluid is suitable for such applications as steam turbine lubrication systems.

EXAMPLE XI

A fluid silicone lubricant was prepared by admixing 8 parts of the organopolysiloxane of Example I with one part of the organopolysiloxane of Example II and one part of the organopolysiloxane of Example IV. This material had a viscosity of 37,000 centistokes at −65° C. and a freezing point of −85° C. to −90° C. Its lubricating characteristics as determined in the Shell Four Ball E. P. Test are as follows:

| Applied load (kg.): | Average scar diameter (mm.) |
|---|---|
| 20 | .30 |
| 30 | .47 |
| 40 | .55 |
| 50 | .64 |
| 60 | .88 |
| 70 | .98 |
| 80 | 1.10 |
| 90 | 1.96 |
| 100 | 2.00 |
| 110 | Weld |

The low viscosity and freezing point of this blend of silicone oils and its excellent lubricating properties in combination with its high thermal stability when admixed with conventional refrigerants such as dichlorodifluoromethane makes it particularly suitable for use as a lubricant in refrigerator compressors.

EXAMPLE XII

A fluid silicone lubricant was prepared by admixing 15 parts of the organopolysiloxane of Example I with 8 parts by weight of the organopolysiloxane of Example IV. This material freezes at a temperature below −60° C. and has the following lubricating properties as determined by the Shell Four Ball E. P. Test.

| Applied load (kg.): | Average scar diameter (mm.) |
|---|---|
| 20 | .35 |
| 30 | .34 |
| 40 | .51 |
| 50 | .60 |
| 60 | .90 |
| 70 | 1.03 |
| 80 | 1.51 |
| 90 | 1.77 |
| 100 | 2.11 |
| 110 | 2.40 |
| 120 | Weld |

When jet engines have the fluid silicone lubricants of Examples V, VII, and IX applied to the ball and roller bearings, accessory transmissions, gears, hydraulic pumps, and the like, such component parts are lubricated satisfactorily at all operating temperatures down to as low as −65° F. The fluids do not freeze at temperatures as low as −65° F. nor do they decompose or pyrolyze at temperatures as high as 400° F.

The fluid silicone lubricant blends prepared in Examples VI, VIII, and X are excellent for application in steam turbine lubrication systems and are excellent lubricants for electric motors and in gear boxes and other applications. Such lubricants do not have the low viscosity at the lowest temperatures of the lubricant blends of Examples V, VII, and IX, however, electric motors, gear boxes and steam turbine lubrication systems ordinarily are not subjected to such low operating temperatures.

The fluid silicon lubricant blends of Examples XI and XII are excellent for use in refrigerator compressors since they have low viscosities and freezing points, excellent lubricating ability, and are thermally stable in the presence of the halogenated aliphatic refrigerants such as dichlorodifluoromethane conventionally used.

Suitable halogenated aliphatic refrigerants comprise derivatives of methane and ethane wherein hydrogen is completely replaced by chlorine and fluorine, and not over a single hydrogen atom remains, there being at least one chlorine and one fluorine atom in each molecule. Examples are dichlorodifluoromethane, trifluorotrichloroethane and difluorochloromethane.

While the present invention has been described with particular reference to certain specific embodiments thereof, it will be understood, of course, that certain changes, substitutions and modifications may be made therein without departing from its true scope.

We claim as our invention:

1. A fluid silicone lubricant consisting essentially of a mixture of (A) from one to twenty-five parts by weight of a liquid linear organopolysiloxane having the formula:

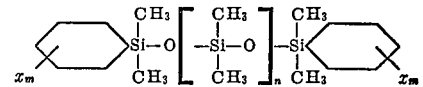

for (B) each one part by weight of at least one liquid linear organopolysiloxane selected from the group consisting of organopolysiloxanes having the formulae:

(a)

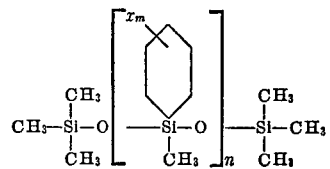

and (b)

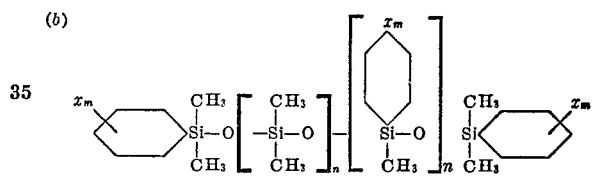

wherein $x$ represents at least one substituent selected from the group consisting of chlorine, fluorine, bromine, and trifluormethyl, $m$ has an average value of from one to five inclusive and $n$ has an average value of not less than two.

2. A fluid silicone lubricant as set forth in claim 1 wherein the liquid linear organopolysiloxane (A) has the formula:

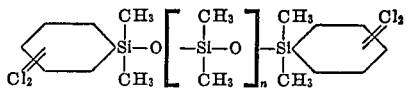

wherein $n$ has an average value of 6.

3. A fluid silicone lubricant as set forth in claim 1 wherein the liquid linear organopolysiloxane (a) has the formula:

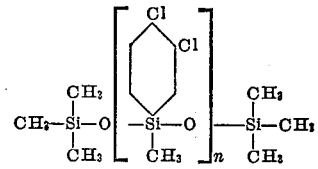

wherein $n$ has an average value of 2.75.

4. A fluid silicone lubricant as set forth in claim 1 wherein the liquid linear organopolysiloxane (a) has the formula:

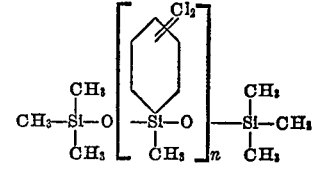

wherein $n$ has an average value of 2.75.

5. A fluid silicone lubricant as set forth in claim 1 wherein the liquid linear organopolysiloxane (b) has the formula:
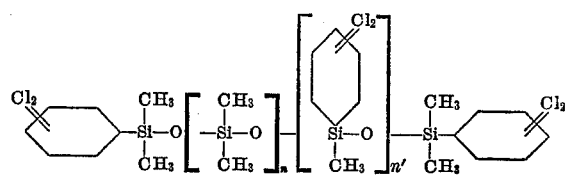
wherein $n$ has an average value of 12 and $n'$ has an average value of 3.
References Cited in the file of this patent
UNITED STATES PATENTS
| | | |
|---|---|---|
| 2,523,863 | Cook | Sept. 26, 1950 |
| 2,547,678 | Wilcock | Apr. 3, 1951 |
| 2,640,066 | Kohl | May 26, 1953 |
| 2,662,055 | Towne | Dec. 8, 1953 |
| 2,689,859 | Burkhard | Sept. 21, 1954 |
| 2,739,952 | Linville | Mar. 27, 1956 |